United States Patent [19]

Nakagawa et al.

[11] 4,054,892
[45] Oct. 18, 1977

[54] SLIT SHUTTER BLADE STABILIZING DEVICE FOR CAMERAS

[75] Inventors: Tadashi Nakagawa; Mitsuo Koyama; Eiichi Onda, all of Yotsukaido, Japan

[73] Assignee: Seiko Koki Kabushiki Kaisha, Japan

[21] Appl. No.: 636,725

[22] Filed: Dec. 1, 1975

[30] Foreign Application Priority Data

Dec. 3, 1974 Japan .................. 49-146571[U]

[51] Int. Cl.² ............................................. G03B 9/10
[52] U.S. Cl. ...................................... 354/252; 354/246
[58] Field of Search .............. 354/245, 246, 248, 249, 354/252, 247

[56] References Cited

U.S. PATENT DOCUMENTS

| | | | |
|---|---|---|---|
| 3,847,476 | 11/1974 | Onda et al. | 354/252 |
| 3,852,786 | 12/1974 | Onda et al. | 354/252 |
| 3,871,012 | 3/1975 | Haraguchi | 354/246 |
| 3,886,572 | 5/1975 | Onda et al. | 354/246 X |

Primary Examiner—Edna M. O'Connor
Attorney, Agent, or Firm—Robert E. Burns; Emmanuel J. Lobato; Bruce L. Adams

[57] ABSTRACT

A camera shutter having an aperture, shutter opening blades which travel from a position covering the aperture to a rest position uncovering the aperture to initiate exposure, and shutter closing blades which travel from a position away from the aperture to a position covering the aperture to terminate exposure, and a shutter blade stabilizing device. The stabilizing device includes an elastic member for frictionally pressing at a leading portion of the shutter opening blades at which the driving force is applied to the blades, when the blades are at the rest position, and a member for pressing against the shutter opening blades at a trailing portion of the blades at a portion where the driving force is applied, when the shutter opening blades are at the rest position. The elastic member and the member for pressing together prevent movement of the shutter opening blades when they are at the rest position.

2 Claims, 7 Drawing Figures

SLIT SHUTTER BLADE STABILIZING DEVICE FOR CAMERAS

Background of the Invention

This invention relates to a stabilizing device for preventing the slit shutter blades of a camera from colliding against each other during their closing motions.

In a slit shutter which comprises opening blades for opening a shutter aperture and closing blades which close the aperture, the opening and closing groups of blades being arranged to run, one following the other, so that when the opening blades reach an open position, they recoil within the plane of their motion and vibrate in the direction perpendicular to the plane of motion due to their irregular motion and also due to inertia. If, therefore, the closing blades follow before the opening blades fully cease to recoil or vibrate, the two groups of blades collide against each other. Such collision damages the shutter blades.

According to the conventionally known method for preventing such recoiling of blades in a slit shutter, the fore end portions of opening blades in motion are braked by means of a friction piece. Although the method of controlling the fore ends in motion by friction produces a desirable effect upon the opening process of exposure, such friction braking causes an increased vibration of the ensuing end portions of these blades and this tends to increase the frequency of their collision with closing blades. Demands for compact shutter assemblies have recently increased. The opening and closing shutter blades, therefore, have come to be arranged closer to one another. This calls for an improvement to eliminate the above stated shortcoming of the conventional method.

SUMMARY OF THE INVENTION

It is therefore the principal object of the present invention to eliminate the above stated shortcoming of the conventional method. In the device according to this invention, the ensuing or trailing portions of the opening blades are pressed and thus can be prevented from vibrating even where the conventional friction piece for stabilizing the opening blades is in use. The details of the device of the present invention will be more clearly understood from a consideration of the following description taken in connection with the accompanying drawings which show preferred embodiments of the device of the invention.

DESCRIPTION OF THE PREFERRED EMBODIMENT

Figures 1, 2:
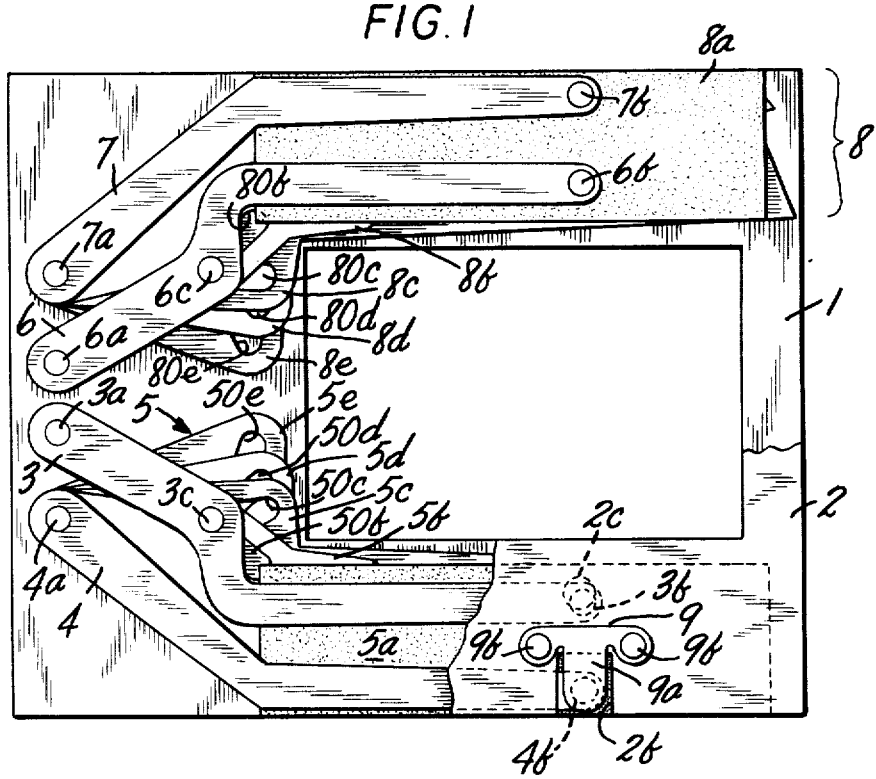
FIG. 1 is a plan view of a camera shutter having the shutter blade stabilizing device according to the invention, when the shutter is set for exposure.
FIG. 2 is a plan view of the embodiment of the invention illustrated in FIG. 1, when the shutter has completed exposure.

Referring to FIG. 1, there is provided an exposure aperture 1a in a shutter base plate 1. A subsidiary or secondary plate 2 which is also provided with a similar aperture is securely positioned to form a space above the base plate 1 by a conventional method.

At the left end of the base plate 1, there are provided an opening operating member 3 and a subsidiary opening member 4 which are pivotally held by shaft 3a and 4a respectively. At the fore ends of the opening operating member 3 and the subsidiary opening member 4, there is provided, among a group of divided opening blades, an opening slit forming blade 5a which is rotatably supported by pins 3b and 4b. Opening covering blades 5b, 5c, 5d and 5e which are arranged on a shaft 4a are respectively provided with actuating slots 50b, 50c, 50d and 50e through which an operating pin 3c is inserted to extend below the opening operating member 3.

In the same manner as the opening parts described above, a closing operating member 6 and a subsidiary closing member 7 are pivotally held to the base plate 1 by shafts 6a and 7a; at the fore ends of the members 6 and 7, a closing slit forming blade 8a of a closing blade group 8 is rotatably held by pins 6a and 7a respectively; and an operating pin 6c is inserted through actuating slots 80b, 80c, 80d and 80e of closing covering blades 8b, 8c, 8d and 8e which are arranged on a shaft 7a, the operating pin 6c thus extending below the closing operating member 6.

A spring plate 9 is secured to the subsidiary plate 2 by pins 9b. The plate 9 is provided with an elastic portion 9a which pushes downward on the pin 4b which is arranged to support the opening slit forming blade disposed as a member of the group of the opening blades at the fore end of the subsidiary opening member 4. The subsidiary plate 2 is also provided with a notch which is formed to enable the elastic portion 9a of the spring plate 9 to extend downward. A protrudent portion 2c which pushes downward the pin 3b supporting the opening slit forming blade at the fore end of the opening operating member 3 is disposed outside the operating area of the pin 4b and at a location that allows the protrudent portion to effectively push the pin 3b.

FIG. 1 illustrates the device of the present invention as in a state wherein the group of the opening blades have completed their actions. FIG. 2 illustrates the same device as in a state of having completed the exposure.

Figure 3:
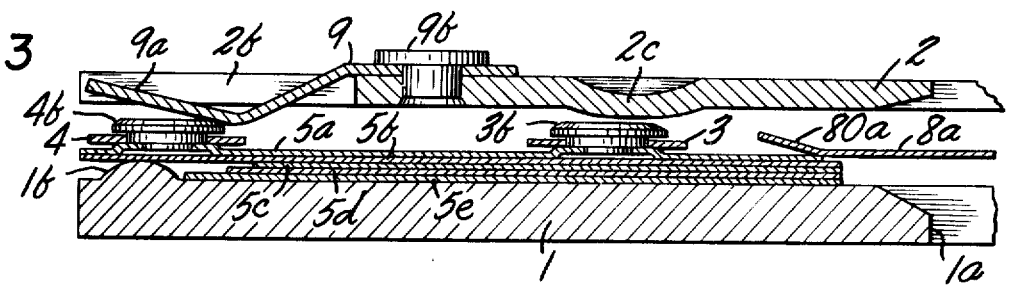
FIG. 3 is a partial sectional view of the embodiment of the invention illustrated in FIG. 2, taken along the lines III—III.

FIG. 3 is a sectional view illustrating the part of FIG. 2 across the line III—III. Referring to FIG. 3, there is provided a narrow gap between the downward protrusion 2c and the pin 3b. The opening slit forming blade 5a is provided with a slightly raised portion at which it is connected to the opening operating member 3. The raised portion serves to reduce operating friction. Another portion of the opening slit forming blade 5a is also raised in the same manner for connection to the subsidiary opening member 4. In order to support from below a pin 4b which is pushed downward from above by the elastic portion 9a of the spring plate 9, a protrusion 1b is provided on the base plate 1. The fore end portion of the closing slit forming blade 8a is bent (a bent portion 80a) to prevent it from colliding with the group of the opening blades.

Figure 4:
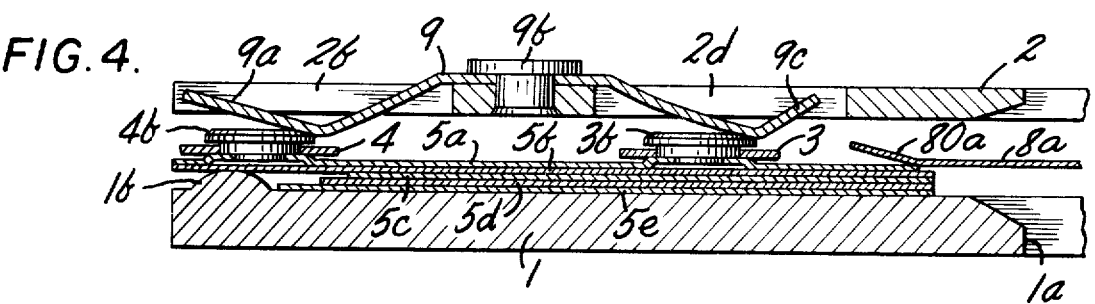
FIG. 4 is a partial sectional view of a second embodiment of the invention.

FIG. 4 is another sectional drawing illustrating the second embodiment of the device of the present invention. In the second embodiment, the downward protrusion 2c of the first embodiment described in the foregoing is replaced with a protrusion which is formed by bending a portion of the spring plate 9. The bent portion 9c thus formed serves also to prevent the blade 5a from recoiling. With the exception of this, all other parts are identical with the first embodiment and the bent portion 9c is also disposed outside the operating area of the pin 4b.

Figure 5:
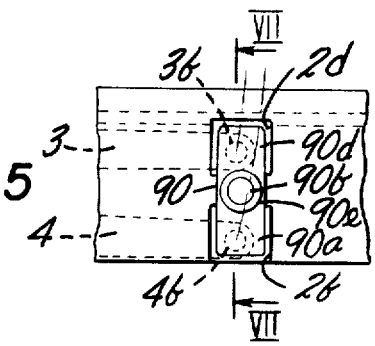
FIG. 5 is a partial plan view illustrating a third embodiment of the invention.
Figure 6:
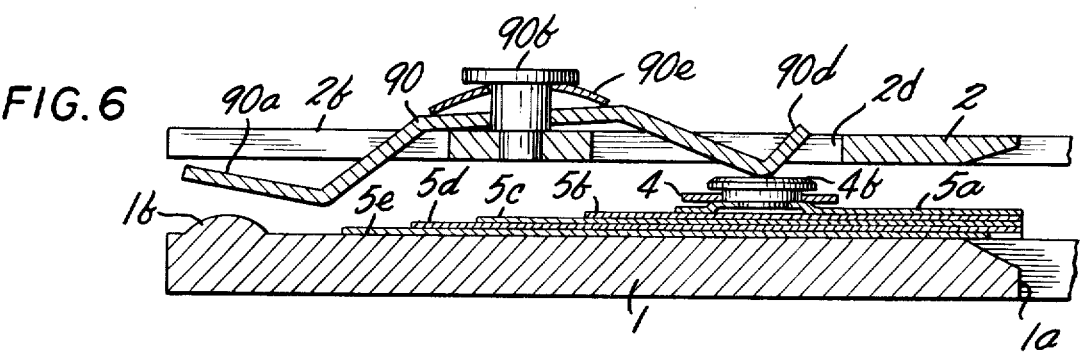
FIG. 6 is a partial sectional view of the embodiment of the invention illustrated in FIG. 5, taken along the lines VII—VII.
Figure 7:
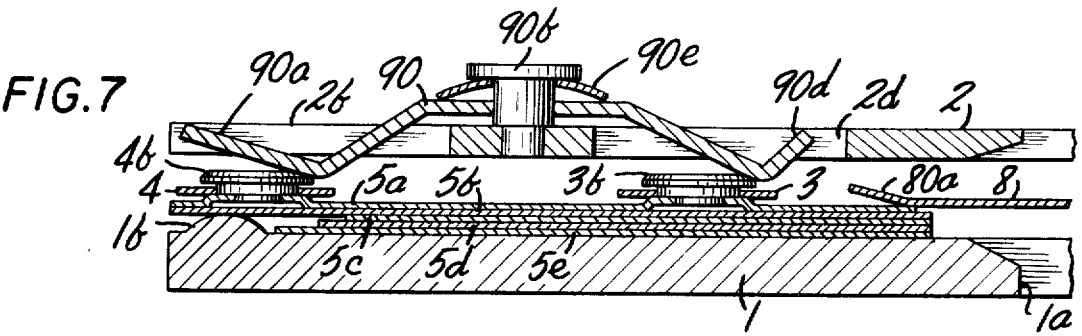
FIG. 7 is another partial sectional view of FIG. 5.

FIG. 5 illustrates the third embodiment of the device of the present invention while FIG. 6 and FIG. 7 are sectional drawings illustrating the operating conditions of the blades of the same embodiment. In FIG. 5, a spring plate 90 is movably fitted to a pin 90b and is provided with a downward bent portion 90a, which engages with a pin 4b, and another downward bent portion 90d which engages with a pin 3b, the spring plate 90 being pushed downward by a spring washer 90e which is held by the pin 90b. The downward bends 90a and 90d which engage with pins 4b and 3b respectively protrude through notches 2b and 2c of a subsidiary plate 2.

The device operates in the following manner: In the condition which is illustrated in FIG. 1, the shutter aperture 1a is open with the group of opening blades 5 having completed their operation. Before the operation of the opening blade group 5, the opening operating member 3 is swung counterclockwise; the opening slit forming blade 5a is displaced in such a way as to cover the upper end part of the aperture 1a; while the subsidiary opening member 4 which is equal in length with the opening operating member 3 supports the opening slit forming blade 5a throughout its motion. The opening covering blades 5b, 5c, 5d and 5e are then actuated by the pin 3c to swing counterclockwise one after another through their slots 50b, 50c, 50d and 50e to cover the aperture.

The group of the opening blades 5 in the above stated condition prior to their operation. When the shutter operation begins in response to operation of the camera release, a clockwise rotating spring force which is not illustrated in the drawing is imparted by known means to the pin 3c. This makes the opening operating member 3 swing clockwise and the opening slit forming blade 5a which is carried at the fore end of the member 3 is in turn pushed by the member 3 downward as viewed in the drawing. Then, since the subsidiary opening member 4 is supporting the opening slit forming blade 5a to ensure its parallel movement, the latter (5a) continuously makes a parallel motion without rotating. Concurrently, the pin 3c causes the opening covering blades 5b, 5c, 5d and 5e to turn one after another through the slots 50b, 50c, 50d and 50e as far as their respective predetermined angles to open the aperture. At the end of the operation of the opening blade group 5, the elastic portion 9a of the spring plate 9 presses the pin 4b of the opening slit forming blade 5a downward by friction to brake the group 5 of blades for deceleration of their high speed motion. When they reach their stopping positions, their recoiling can be more effectively prevented with the elastic portion 9a arranged to push the pin 4b in the left direction as illustrated in FIG. 3.

Furthermore, in the operating cycle of the group 5 of the opening blades, their high speed motion keeps them vibrating throughout their operating motion. Their vertical motion in the direction perpendicular to their operating direction then tends to momentarily increase when they come to a sudden stop. The pin 4b of the forerunning portion being under pressure, this further increases the vertical motion. However, the pin 3b of the ensuing portion is being pressed by the downward protrusion 2c and, by this, the group 5 of opening blades are instantly stabilized.

The opening covering blades 5c, 5d and 5e are not provided with the rear end portions for the purpose of minimizing the inertia in their operation. Thus they do not come beneath the pin 4b when the operation is completed. Therefore, a protrusion 1b is provided on the base plate 1 for the purpose of supporting the pin 4b from below when the pin 4b is being pressed by the elastic portion 9a (see FIG. 3).

With a certain desired length of time elapsed from the exposure operating condition as illustrated in FIG. 1, when a clockwise turning spring force is applied to the pin 6c of the closing operating member 6 by unillustrated known means, the closing operating member 6 swings clockwise in such a way as to push the closing slit forming blade 8a, which is supported at its fore end, in the downward direction as viewed in the drawing. Then, the closing slit forming blade 8a, which is being held by the subsidiary closing member 8 makes a parallel motion. Concurrently with this, the pin 6c actuates the closing covering blades 8b, 8c, 8d and 8e to turn one after another through the slots 80b, 80c, 80d and 80e as far as their predetermined angles respectively to close the aperture for the termination of the exposure (see FIG. 2).

At the end of the exposure, the fore end of the closing slit forming member is forced to move over the stabilized opening blade group 5 as the fore end is bent in such a manner as not to collide against the blade group 5. See FIG. 3.

FIG. 4 illustrates the second embodiment example. In this example, the downward protrusion 2c is replaced with a bent part 9c, which pushes the pin 3b downward in place of the protrusion 2c. In order that the opening slit forming blade 5a is more surely prevented from recoiling, the bent portion 9c not only pushes the pin 3b downward but also brakes it by friction in the same manner as the elastic portion.

FIG. 5, 6 and 7 illustrate the third embodiment example of the present invention. FIG. 6 illustrates the opening blades as in operation while FIG. 5 and 7 illustrate the opening blades in a state after completion of their operating motions.

Unlike the preceding embodiment, a plate 90 which is provided with downward protrusions 90a and 90d does not have to have elasticity at the above stated protrusions. Instead of using such elastic protrusions, a separate spring plate 90e may be arranged to push the plate 90 downward. As apparent from FIG. 6, the plate 90 remains inactive while the pin 4b is passing the downward protrusion 90d. When the pin 4b comes to a point below the downward protrusion 90a, the protrusion 90a is pushed upward in such a way as to cause the other downward protrusion 90d to suddenly press the pin 3b, so that a great effect can be attained within a short stroke. Such arrangement is therefore suitable for application to compact shutter assemblies which are in great demand in these days.

Although it is not illustrated, the strength of the spring plate 90e is adjustable from outside.

In their motions, the group of opening blades vibrate in various directions. This tends to cause adverse effects, of which recoiling and collision are most detrimental to the shutter operation. In the device of the present invention, however, such recoiling and collision are prevented by stabilizing the motions of the opening blades in the initial stage of the operation as described in the foregoing. The device being not only simple in structure but also permitting operation with a short stroke, the use of it is suitable and greatly advantageous for compact cameras.

We claim:

1. In a camera shutter of the type having a shutter aperture, shutter opening blades which travel leading edge first in substantially parallel planes from a position covering said aperture to a rest position uncovering said aperture to initiate exposure through said aperture, driving means for applying a driving force to said shutter opening blades for driving said blades to travel and uncover said aperture, and shutter closing blades which travel from a position away from said aperture to a position covering said aperture to terminate exposure; an improved shutter blade stabilizing device comprising an elastic member for frictionally pressing at a leading portion of said shutter opening blades at a portion where the driving force is applied when said shutter opening blades are positioned at said rest position, and means for pressing against said shutter opening blades in a direction perpendicular to their respective planes of motion at a trailing portion of said shutter opening blades at a portion where the driving force is applied when said shutter opening blades are positioned at said rest position for preventing movement of said shutter opening blades at said rest position.

2. In a camera shutter according to claim 1, wherein the camera shutter includes a base plate having said shutter aperture therethrough, a secondary plate spaced from said base plate, said shutter opening blades and said shutter closing blades being disposed between said base and said secondary plates, and said elastic member being mounted on said secondary plate at a position to make frictional contact and press against said shutter opening blades, and wherein said means for pressing comprises a protruding portion of said secondary plate positioned to press against said shutter opening blades.

* * * * *